June 4, 1940.     H. E. GRAU ET AL     2,203,139
DRILLING HOOK
Filed Dec. 3, 1938
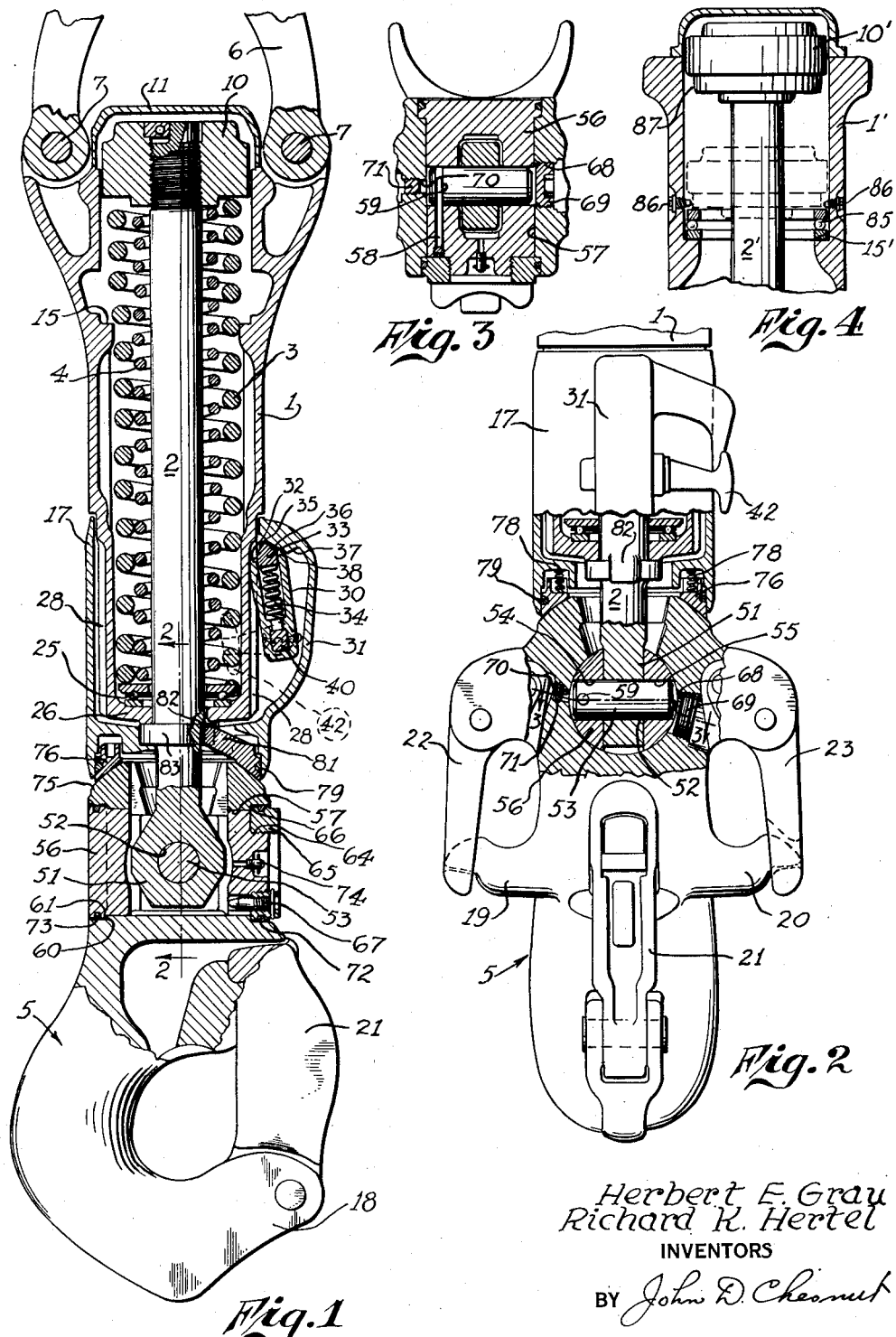
Herbert E. Grau
Richard K. Hertel
INVENTORS
BY John D. Chesnut
ATTORNEY Patented June 4, 1940

2,203,139

UNITED STATES PATENT OFFICE 2,203,139

DRILLING HOOK

Herbert E. Grau and Richard K. Hertel, Vernon, Calif., assignors to Byron Jackson Co., Huntington Park, Calif., a corporation of Delaware Application December 3, 1938, Serial No. 243,824

8 Claims. (Cl. 294—82)

This invention relates generally to hooks, and particularly to drilling hooks such as are used in drilling oil wells. The invention relates particularly to improvements in a drilling hook of the type shown in the patent to N. K. Smith No. 1,825,018, dated September 29, 1931, and embodies several of the features disclosed and claimed in applicants' copending application for Drilling hook, Ser. No. 178,240, filed December 6, 1937, now Patent No. 2,158,232, dated May 16, 1939.

A principal object of the present invention is to provide a drilling hook having a universal tilting mounting and in which the overall length is reduced to a minimum.

A further object is to provide a drilling hook in which the swivel bearing is subjected only to the compression load on the spring.

A still further object is to provide a drilling hook in which the hook body is universally pivotally mounted on a shank which is slidably and rotatably mounted in the spring housing.

A still further object is to provide a hook having a novel universal pivotal mounting of the hook body on the shank.

Other objects and advantages will be apparent from the following description of a preferred embodiment and a modification thereof wherein:

Fig. 1 is a longitudinal sectional view of the preferred embodiment;

Fig. 2 is an elevation of the lower portion of the hook as viewed from the right of Fig. 1, parts being broken away to show a central longitudinal section through the universal joint on line 2—2 of Fig. 1;

Fig. 3 is a fragmentary transverse sectional view taken on the broken line 3—3 of Fig. 2; and Fig. 4 is a fragmentary longitudinal sectional view of the upper portion of the hook showing a slightly modified construction.

Referring to Figs. 1 and 2 of the drawing, the hook comprises generally a housing 1 in which is mounted a hook shank or stem 2, the shank being resiliently supported on a pair of compression springs 3 and 4 and supporting at its lower end a hook body generally designated 5. The housing is adapted to be suspended from a travelling block or other support by means of an inverted U-shaped bail 6 detachably secured to the housing by pins 7.

The housing 1 is of unitary construction and is open at both ends, the opening in the lower end being only of sufficient size to loosely receive the shank 2. The opening in the upper end is of a size to permit the insertion of the springs 3 and 4 and of a nut 10 threadedly engaging the upper end of the shank and supported on the springs. The upper opening is closed by a cap 11 to exclude foreign matter from the interior of the housing.

The springs 3 and 4 are of a capacity sufficient to support a load constituting only a relatively small fraction of the full capacity of the hook. When the load exceeds the predetermined spring capacity the springs compress and permit the hook and shank to move downwardly relative to the housing. An upwardly facing shoulder 15 is provided in the housing bore to engage the nut 10 and limit the downward movement of the hook and shank, and to transmit the load from the nut 10 directly to the upper portion of the housing 1 instead of through the springs to the lower portion of the housing, as is the case when the nut 10 is disengaged from the shoulder 15.

It is desirable to completely enclose the hook shank 2 at all times, irrespective of its axial position relative to the housing, in order to exclude dirt and other foreign matter. This is accomplished by a sleeve 17 secured to the shank and movable therewith in telescopic relation to the lower portion of the housing 1.

The hook body 5 is preferably, although not necessarily, of the type shown in the aforementioned patent to Smith, No. 1,825,018, having a lower central load-supporting bill 18 and a pair of upper laterally extending bills 19 and 20 (Fig. 2). Locking arms 21, 22, and 23, respectively, are provided for retaining the load in the respective bills and preventing inadvertent release thereof.

The construction thus far described is similar in all material respects to that disclosed in applicants' Patent No. 2,158,232, and therefore a more detailed description thereof is believed to be unnecessary.

Drilling hooks in general use at the present time usually provide a swivel connection between the load-engaging hook body and the spring housing, and in most instances an anti-friction swivel bearing is provided. The bearing is subjected to the full load, and must therefore be of relatively heavy duty capacity. It is a fact, however, that practically all swiveling of the hook occurs when only a single stand of pipe is being supported, as when connecting or disconnecting sections of drill pipe, casing, or tubing. Under these circumstances the load is not sufficient to compress the springs to the extent that the shank nut seats on the stop shoulder. It rarely becomes necessary to rotate the hook body relative to the housing when the suspended load exceeds the compressive strength of the springs.

With the above considerations in mind, we have provided a construction wherein the swivel bearing is subjected only to the spring-supported load, and not to the load transmitted to the housing through the stop shoulder. In this way we are enabled to use a bearing of considerably smaller capacity, thus reducing the manufacturing cost.

As shown in Fig. 1, we have interposed an anti-friction bearing 25 between the lower ends of the springs 3 and 4 and the flange 26 at the base of the housing I. The springs are thus mounted for rotation with the shank 2 and hook body 5 relative to the housing. The load on the bearing is obviously limited to that supported by the springs.

It is frequently desirable to positively lock the hook body 5 against rotation with respect to the housing, and in the present instance this is effected by the provision of releasable locking means between the sleeve 17 and the housing I. A plurality of longitudinally extending grooves or keyways 28 are formed in the outer wall of the housing below the upper extremity of the sleeve 17 when the latter is in its uppermost position. Only two diametrically opposite keyways are shown in Fig. 1, but it will be understood that any desired number may be provided whereby the hook body may be locked in any one of several angularly related positions. A locking member 30 is pivotally mounted for rocking movement within a housing 31 formed by an enlargement on the sleeve 17, and has a rib or key 32 formed on its side adjacent the housing. The key 32 is adapted to enter one of the keyways 28 when the locking member is rocked inwardly, to lock the sleeve and hence the hook body against rotation relative to the housing I, while permitting relative axial movement between these elements during compression or expansion of the springs 3 and 4. The locking member 30 is yieldably retained in either its locked or released position by a spring pressed plunger 33 slidably mounted in the member 30 and urged upwardly by a spring 34. The outer end of the plunger is oppositely beveled to provide cam surfaces 35 and 36 adapted to engage the oppositely inclined surfaces 37 and 38, respectively, on the inner wall of the housing 31 and thus urge the locking member in one direction or the other.

The locking member 30 is mounted on a pivot pin 40 journaled in the housing 31, the pin projecting through the wall of the housing and having an operating handle 42 (Fig. 2) secured thereto. It will be evident that when the operating handle 42 is raised from the position shown, the locking member is rocked outwardly and the plunger 33 is forced downwardly against the action of spring 34 until the apex of the plunger passes the junction of surfaces 37 and 38; the plunger then enters the recess outwardly of surface 37 and is yieldably retained therein by the spring 34. In this position the key 32 is clear of the housing I, and the sleeve 17, shank 2, and hook body are free to rotate relative to the housing.

The hook body 5 is connected to the shank 2 by a universal joint which permits tilting of the hook body in any direction relative to the shank. The lower end of the shank is enlarged and flattened to form an eye 51 having a transverse bore 52 for the reception of a pivot pin 53, the pivot pin being mounted in aligned transverse bores 54, 55 in a yoke member 56. As shown in Figs. 1 and 3, the yoke member is generally cylindrical in shape and is journaled in a transverse bore 57 in the upper portion of the hook body 5. The axis of the bore 57 being at right angles to and intersecting that of the pin 53, it will be evident that the hook body is tiltable relative to the shank about two rectangularly related, intersecting axes constituting a universal pivotal connection. Preferably, the pin 53 has a close driving fit in the bores 54 and 55 of the yoke member, and the eye 51 of the shank is pivotally mounted on the pin, although if desired the pin may be journaled in the yoke. As shown in Fig. 3, the pin is held against endwise movement by a locking pin 58 insertible in a bore in the yoke member and engaging a recess 59 in the pin.

An enlarged head is formed at one end of the yoke member 56, providing a shoulder 60 adapted to abut against a shoulder formed at the base of a counterbore 61 in the hook body, to limit the movement of the yoke member to the right, as viewed in Fig. 1. The opposite end of the yoke member is reduced and threaded at 64 for engagement by a clamping nut 65. The bore 57 in the hook body is also counterbored at this end to provide a stop shoulder 66 against which the nut 65 abuts. A lock screw 67 is threaded in the nut and engages a recess in the yoke member to lock the nut in clamping position.

Packing rings 72 and 73 are provided on the nut 65 and on the enlarged head on the opposite end of the yoke member, to prevent leakage of lubricant from the joint. A fluid-tight lubricant reservoir is thus provided within the head and yoke member, which may be supplied with lubricant through a fitting 74 in the nut, thus affording adequate lubrication of the pivotal bearing surfaces.

It is desirable that the hook body be sealed to the sleeve 17 in all tilted positions of the hook to prevent admission of foreign matter and leakage of lubricant. To this end the upper end of the body member is formed with a convex spherical surface 75. A combined sealing and brake ring 76 is mounted within a bore in the lower extremity of the sleeve 17, and is formed with a concave spherical surface on its lower face for engagement with the convex spherical surface on the hook member. The ring 76 is yieldably urged downwardly against the hook body by a plurality of circumferentially spaced coil springs 78 (Fig. 2), thus effecting a tight seal with the hook body in all tilted positions of the latter. The frictional engagement of the complementary spherical surfaces also functions as a brake to restrain the hook body from too free tilting. A sealing gasket 79 seals the ring 76 to the sleeve 17.

The sleeve 17 and ring 76 are interlocked with the shank 2 by an inwardly extending key 81 formed on the ring 76 and projecting through a suitable slot in the hub of the sleeve 17 into engagement with a recess 82 in a flange 83 formed on the shank 2. Thus when the key 32 on the locking member 30 is in engagement with one of the keyways 28 in the housing I, the sleeve 17 and hence the ring 76, shank 2, and hook body 5 are locked against rotation relative to the housing I.

In order to provide for assembly and dismantling of the universal joint, a bore 68 (Figs. 2 and 3) is provided in the hook body, in alignment with the pin 53 when the shank is tilted through its maximum arc to the right as viewed in Fig. 2. The bore 68 opens outwardly into the recess formed between the bifurcated arms on which the upper locking arm 23 is pivoted. The mode of assembly of the universal joint is as follows: The yoke member 56 is inserted in the hook body from the left in Fig. 1, and the eye 51 on the shank is then inserted through the tapered opening in the upper end of the housing and into the slot provided therefor in the yoke member. The shank and yoke member are then tilted about the axis of the latter until the bores 52, 54, and 55 are in alignment with the bore 68 in the hook body. The pin 53 may then be inserted and locked in place by the locking pin 58, and a plug 69 threaded into the bore 68 to close the latter. The yoke member 56 is then secured by the nut 65, which in turn is locked by the locking pin 67. A small bore 70 is provided in the hook body at the end of the pin opposite the bore 68, for the insertion of a tool for forcing the pin out when disassembling the joint. This bore is normally closed by a plug 71.

In the event that it should be desirable to provide free swivelling of the hook body relative to the housing when the suspended load exceeds the compressive strength of the springs, bearing means may be provided between the stop shoulder and the shank nut, in addition to the light duty bearing 25. Such bearing means may take the form of a hardened steel ring superimposed on the stop shoulder and engageable by the nut, or, if desired, an antifriction bearing may be mounted on the shoulder, to be engaged by the nut only when the springs are compressed.

In Fig. 4 we have illustrated a modification embodying an antifriction bearing 85 mounted on the stop shoulder 15'. The bearing is retained in place when the shank nut 10' is disengaged therefrom, by means of a plurality of holddown screws 86 threaded through the housing 1' and spaced slightly above the upper race of the bearing. The lower face of the shank nut is cut away at 87 to provide a recess for reception of the holddown screws when the nut engages the bearing.

It will be understood that the provision of such a bearing could be made optional without involving any substantial modification of the construction shown in Fig. 1.

Although we have illustrated and described in detail a preferred embodiment of the invention and a slight modification thereof, it is to be understood that various other modifications may be made in the particular structure shown without departing from the invention, and the latter is to be limited only as set forth in the appended claims.

We claim:

1. A hook structure comprising a hook member, a supporting member for supporting said hook member and including a housing, a compression spring mounted in said housing, a stem yieldably supported by said spring and slidably and rotatably mounted in said housing and extending downwardly below said housing, and means for mounting said hook member on the lower extremity of said stem for universal tilting movement relative thereto comprising a yoke member journaled in said hook member on a normally substantially horizontal axis, and means pivotally connecting said stem to said yoke member for tilting movement relative thereto on a normally substantially horizontal axis extending at right angles to and intersecting the axis of said yoke member.

2. A hook structure as set forth in claim 1, and including a sleeve member fixed to said stem and surrounding the lower portion of said housing, and means for effecting a seal between said sleeve and said hook member in all tilted positions of said hook member relative to said sleeve.

3. A hook structure as set forth in claim 1, and including a sleeve fixed to said stem and surrounding the lower portion of said housing, an annular sealing ring mounted in said sleeve and having an annular sealing surface in sealing engagement with a cooperating annular sealing surface on said sleeve, said sealing ring and said hook member having interengaging complementary spherical surfaces effecting a seal in all tilted positions of said hook member relative to said sleeve.

4. A hook structure as set forth in claim 1, in which said means for pivotally connecting the stem to the yoke member comprises a vertically extending slot in said yoke member, a transverse bore in said yoke member having its axis perpendicular to and intersecting the axis of said yoke member and traversing said slot, said stem having a head on its lower extremity disposed in said slot and said head having a transverse bore disposed in alignment with the transverse bore in said yoke member, and a pivot pin mounted in said aligned bores.

5. A hook structure comprising a hook member, a supporting member for supporting the hook member and including a housing, a compression spring mounted in said housing, a stem yieldably supported by said spring and slidably and rotatably mounted in said housing and projecting therebelow, said hook member being connected to the lower end of said stem, a sleeve fixed to the projecting portion of said stem and slidable and rotatable therewith and extending upwardly about the lower portion of said housing, and means for releasably locking said sleeve against rotation relative to said housing while permitting relative axial movement between said housing and sleeve.

6. A hook structure as described in claim 5, in which said locking means comprises a locking member mounted on said sleeve for movement into and out of interlocking engagement with a cooperating locking element on said housing.

7. A hook structure as defined in claim 5, in which said locking means comprises a longitudinally extending groove in the wall of said housing, and a latch member mounted on said sleeve and having a projection movable into and out of said groove.

8. A hook structure comprising a hook member for engaging a load, supporting means for said hook member and including a stem, and a universal pivotal connection between said stem and hook member comprising a yoke member journaled in the hook member on a normally horizontal axis, and a head on the stem journaled on said yoke member on a normally substantially horizontal axis perpendicular to and intersecting the axis of said yoke member.

HERBERT E. GRAU.
RICHARD K. HERTEL.